A. H. RANKIN.
AUTO SKID CHAIN HOOK.
APPLICATION FILED MAY 25, 1921.
1,427,848.
Patented Sept. 5, 1922.
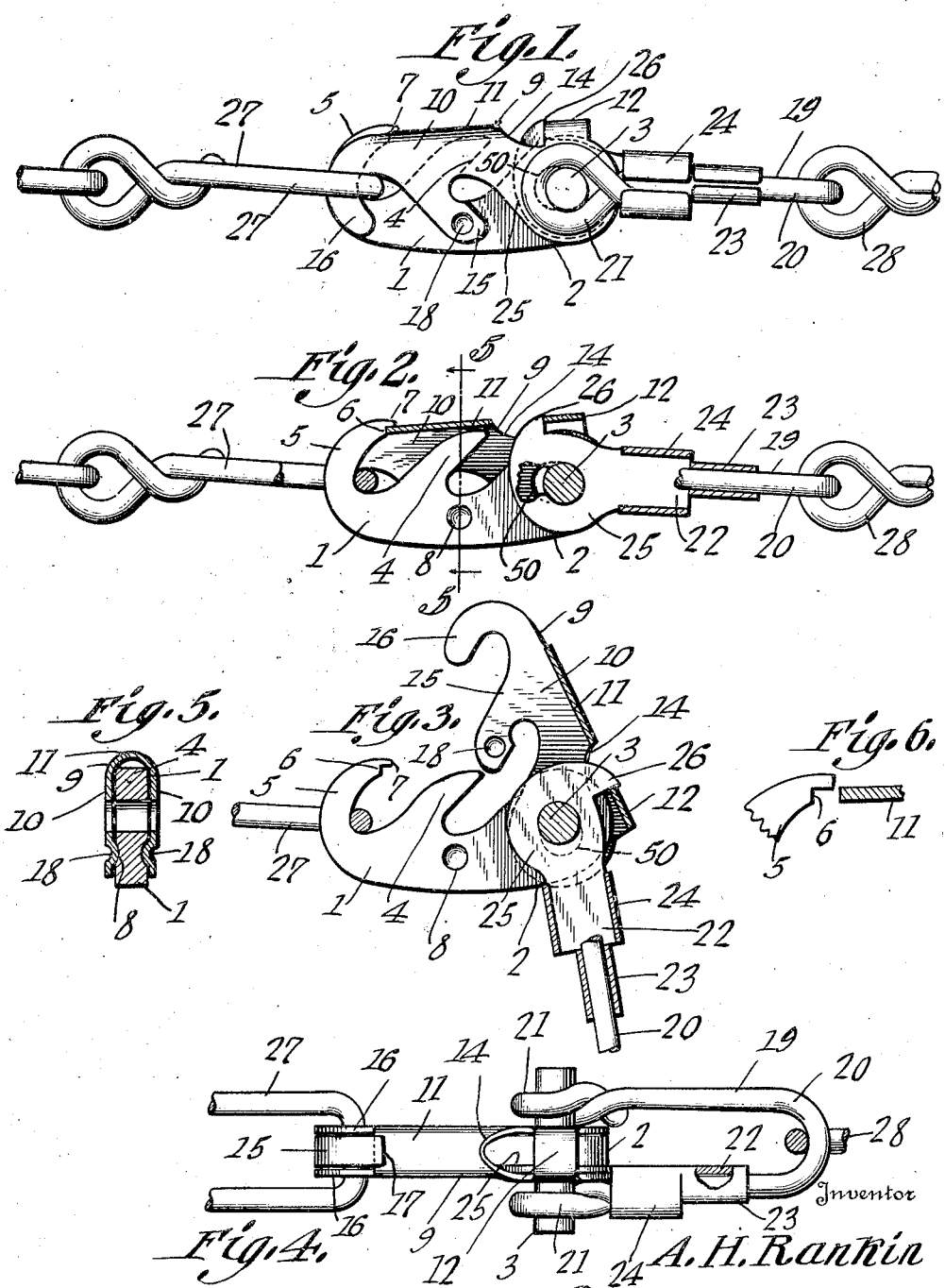
Inventor
A. H. Rankin
By C. A. Snow & Co.
Attorney Patented Sept. 5, 1922.

1,427,848

UNITED STATES PATENT OFFICE.

AUSTIN H. RANKIN, OF STOY, ILLINOIS.

AUTO SKID-CHAIN HOOK.

Application filed May 25, 1921. Serial No. 472,350.

*To all whom it may concern:*

Be it known that I, AUSTIN H. RANKIN, a citizen of the United States, residing at Stoy, in the county of Crawford and State of Illinois, have invented a new and useful Auto Skid-Chain Hook, of which the following is a specification.

This invention aims to provide novel means for connecting the side chains of an anti-skidding device, although the structure forming the subject matter of this application is not confined to the use specified.

The invention aims to provide novel means whereby a pair of members may be connected securely but releasably, it being possible to open and close said members with respect to each other, rapidly and without difficulty.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the drawings:—

Figure 1 shows in side elevation, a device constructed in accordance with the invention; Figure 2 is a longitudinal section, wherein parts appear in elevation; Figure 3 is a longitudinal section wherein the constituent members of the connector are opened; Figure 4 is a plan of the device, the parts being disposed as shown in Figure 1; Figure 5 is a cross section on the line 5—5 of Figure 2; and Figure 6 is a fragmental detail, diagrammatic in nature, and illustrating one step in the operation of the device.

In carrying out the invention there is provided a main member 1 having a head 2 carrying a transverse pivot element 3, the main member having an inner hook 4 and an outer hook 5, the duplication of the hooks permitting adjustment. The outer hook 5 is cut away to form a shoulder 6 and to fashion a reduced bill 7. Seats or depressions 8 are formed in the opposite side faces of the main member 1.

The device includes a trough-shaped auxiliary member 9 which receives the main member 1, the member 9 including resilient side wings 10 connected by a crown 11 having an opening 14 defining an arch 12. The side wings 10 have inner hooks 15 cooperating with the hook 4 of the main member 1, the side wings being provided with outer hooks 16 coacting with the outer hook 5 of the main member 1. The end of the auxiliary member 9 is cut away to form a notch 17, receiving the outer hook 5 of the main member 1, as shown in Figure 4. Bosses 18 are struck from the inner hooks 15 of the auxiliary member 9 and are adapted to be received in the seats 10 of the main member 1 to aid in holding the main and auxiliary members closed, with respect to each other, as shown in Figure 1.

The device includes a combined connecting and releasing device 19, which is a composite structure, the said device including a link 20 terminating in bearings 21, whereby the link is mounted pivotally on the element 3 of the main member 1. The numeral 22 denotes an arm extended along one side portion of the link 20, the arm having bendable tongues 23 and 24 engaged around the said side portion of the link. The arm 22 terminates in a disk 25 located between one wing 10 of the member 9 and the head 2 of the main member 1 and mounted to swing on the pivot element 3, the disk 25 having a projection 26 located in the opening 14 of the trough-shaped auxiliary member 9, and adapted to cooperate with the arch 12 of the auxiliary member.

Especial attention is directed to the fact that the side wings 10 of the auxiliary member 9 are provided with openings 50 receiving the pivot element 3, the openings being elongated in the direction of the length of the member 9, the construction being such that the members 9 and 1 are connected, not only pivotally, but, as well, for relative longitudinal movement. The numerals 27 and 28 denote two parts which are to be connected, such, for instance, as the links of an anti-skidding device, the link 28 being engaged with the link 20 of the combined connecting and releasing device 19. Then the link 27 is engaged with hook 5 of the main member 1, the auxiliary member 9 being in open position, as shown in Figure 3. The auxiliary member 9 is brought into a closed position as shown in Figure 2 or in Figure 1. Then, the pull of the link 27 comes on the hooks 16 of the auxiliary member 9, and the auxiliary member 9 is moved in the direction of its length, because the openings in the side wings 10 of the member 9 are elongated in the direction of the length of the member 9. The end of the crown 11 of the member 9 engages beneath the bill 7 of the hook 5 of the member 1, and abuts against the shoulder 6.

When it is desired to open the device into the position shown in Figure 3, the crown 11 of the member 9 is slid from beneath the bill 7 it being possible to move the member 9 endwise, since it will be recalled, the opening 50 in the member 9, which receives the pivot 3 is elongated. The connecting and releasing device 19 then is swung on the pivot element 3, the projection 26 of the connecting and releasing device engaging the arch 12 of the auxiliary member, the auxiliary member being swung into the open position shown in Figure 3. The bosses 18 of the member 9 coact with the seats 8 of the member 1 to hold the members in closed position as shown in Figures 1 and 5.

I claim:—

1. In a device of the class described, a pair of members having coacting hooks; and means for connecting said members pivotally, whereby the hooks may be brought into overlapped coacting relation, and for relative longitudinal movement, whereby when relative movement between said members occurs, responsive to tension in opposite directions on said members a part of one of said members will be engaged and held directly beneath the bill of the other of said members.

2. In a device of the class described, a pair of members having coacting hooks; and means for connecting said members pivotally, whereby the hooks may be brought into coacting relation; and a combined connecting and releasing device fulcrumed on said means, the connecting and releasing device and one of said members, having interengaging elements cooperating to dispose said members in open position.

3. In a device of the class described, a pair of members having coacting hooks; means for connecting said members pivotally, whereby the hooks may be brought into cooperating relation, and for relative longitudinal movement, whereby when relative longitudinal movement between said members occurs, a part of one of said members will engage beneath the hooks of the other of said members; and a combined connecting and releasing device fulcrumed on said means, the connecting and releasing device, and one of said members, having interengaging elements cooperating to dispose said members in open position.

In testimony that I claim the foregoing as my own, I have hereto affixed my signature in the presence of two witnesses.

AUSTIN H. RANKIN.

Witnesses:
W. W. MARTIN,
J. C. LANE.